UNITED STATES PATENT OFFICE.

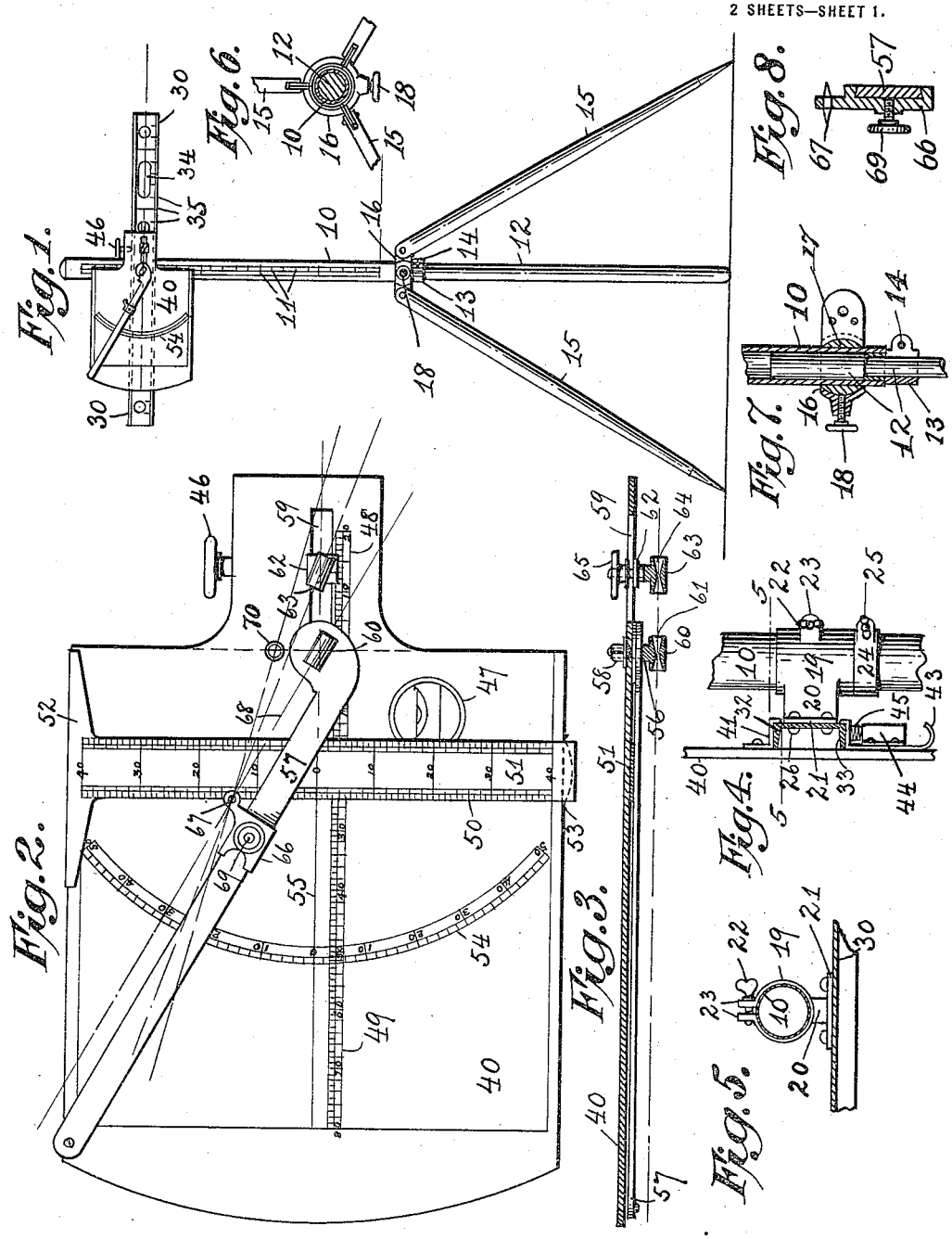

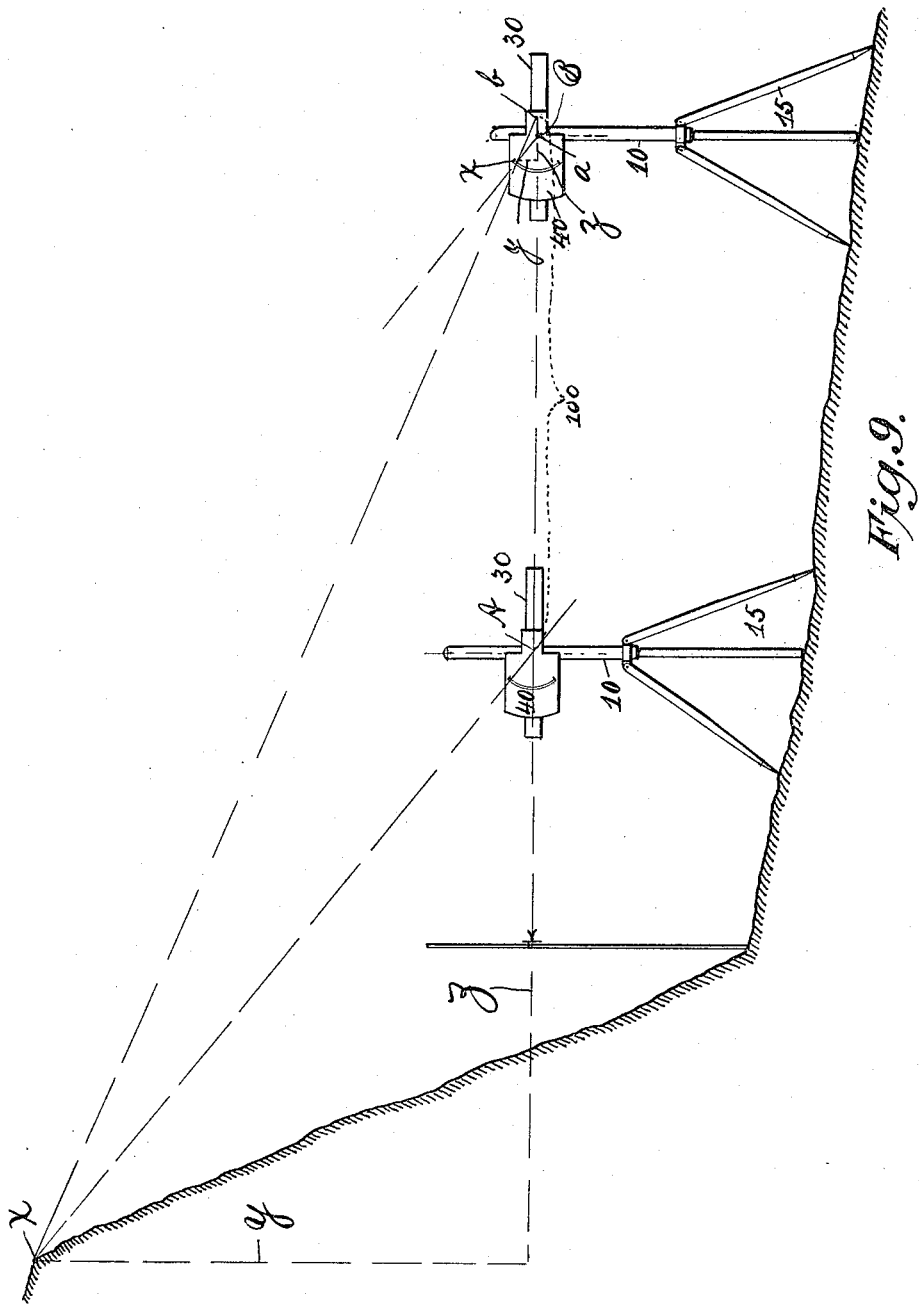

ROBERT YATES, OF PASSAIC, NEW JERSEY.

SURVEYING INSTRUMENT.

1,145,050.

Specification of Letters Patent. Patented July 6, 1915.

Application filed August 29, 1913. Serial No. 787,246.

*To all whom it may concern:*

Be it known that I, ROBERT YATES, a citizen of the United States, residing at Passaic, in the county of Passaic and State of New Jersey, have invented certain new and useful Improvements in Surveying Instruments, of which the following is a specification.

This invention relates to a surveying instrument, called a cross-section instrument, and its novelty consists in the construction and adaptation of the parts and in the application of the principles governing its mode of operation. Its object is to provide a simple, efficient and economical device whereby there may be rapidly and accurately measured the distances from a given point to any other point in the same cross-section within reasonable limits, whether the points whose distance is to be measured are accessible or not, and thus quickly to secure data for the making of maps, the location of railway lines or other applications of surveying.

In the drawings, Figure 1 is an elevation of an instrument embodying the invention; Fig. 2 is an elevation of the reading board on an enlarged scale; Fig. 3 is a central horizontal section of the parts shown in Fig. 2; Fig. 4 is a detail in elevation of the cross arm and reading board support; Fig. 5 is a horizontal section on the plane of the line 5—5 in Fig. 4; Fig. 6 is a detail in plan of the ball and socket ring support for the staff; Fig. 7 is a vertical section through the parts shown in Fig. 6; Fig. 8 is a detail in section of the needle sight carrier and connected parts, and Fig. 9 is an illustration of a mode of using the instrument.

In the drawings, 10 is a staff preferably made of tubular form and externally graduated in terms of lineal measurement, as indicated at 11. It is provided with a downwardly extending foot-piece 12 which is adapted to telescope inside of the staff and with a clamping collar 13 having a thumb screw 14 of usual form, whereby the foot-piece may be retained in any desired position with respect to the staff. Any means may be employed to support the staff, but the preferred means is a tripod 15 provided with a ring indicated at 16 having a spherical socket and adapted to support a ball 17, secured to or made integral with the staff 10, so that the staff may be moved in any direction on the tripod. A set-screw 18 is provided to keep the staff in position after its adjustment. At a convenient place along the staff 10 it is provided with an encircling collar 19 slidably mounted thereon and having an outwardly projecting flange 20 terminating in a flat plate 21. A set-screw 22 passing through ears 23, extending from the collar serves to hold it in position, and either to secure it rigidly when the set-screw 22 is tightened or to allow it to rotate thereon when the screw is slightly loosened. Beneath the collar 19 is a second supplementary collar 24, also provided with a clamp indicated at 25. When this second collar is firmly clamped in position on the staff and the collar 19 is loosely clamped thereon it is obvious that the latter will rest upon the former and that the collar 19 can be rotated as on a hinge of which the staff 10 forms a pintle.

The collar 19 is adapted to support a cross arm or limb 30 which is thereby rendered rotatable around the staff 10 in a horizontal plane. This arm is illustrated in the form of a channel bar (although it may be of any desired shape) secured to the plate 21 by any suitable means as bolts 26. It is provided with two flanges 32 and 33 and at any suitable place with a level indicated at 34. On its front edge it is provided with graduations in terms of lineal measurement indicated at 35.

Slidably mounted on the limb or cross arm 30 is a reading board 40 having a front plane surface and of any suitable size and material. At its rear side it is provided with a series of two or more shoes 41 adapted to engage the upper flange 32 of the cross arm and with one or more spring-held snap shoes 42 adapted to engage the lower flange 33 of the cross arm. The snap shoes are provided with a downwardly projecting hand hold 43. A bracket 44 secured to the board 40 carries a spring 45 which normally presses the shoe 42 against the flange 33. When the hand hold is pulled downward the spring 45 is compressed and the shoe 42 released from engagement with the flange 33, and the board 40 can then be moved along the cross arm to any desired position. Releasing the hand hold causes the shoe 42 to again engage the cross arm and hold the board in place. A leveling screw indicated at 46 attached to the board 40 and bearing against the cross arm affords means for adjusting the board to an exact level, a level 47 being secured to or inserted into the board to facilitate such adjustment. The board 40 is provided on its front face with four scales, a base scale indicated at 48, and in the illustration shown as graduated to read from 0 to 20 from left to right; a horizontal reading scale indicated at 49 arranged in line with the base scale and graduated to the same scale but reading from right to left and extending well toward the left edge of the board, in the case shown, reading from 0 to 80; a vertical scale 50 reading upward and downward from 0 to 40 in both directions, and displayed upon a horizontally movable member 51 having a flange 52 engaging the upper end of the board 40 with a sliding fit and a spring 53 engaging the lower end of the board with a yielding fit; and a circular scale 54 having a zero point in the same horizontal zero line 55 as the zero point of the scale 50 and graduated in degrees and minutes. At a suitable point in the horizontal line 55 the board 40 is apertured and provided, if necessary, with a bearing to receive a short shaft 56 provided with a radially projecting sighting arm 57, and which shaft is adapted to carry an initial sighting member 60 having a peep hole 61, the medial line of which is coincident with the axis of rotation of the shaft 56, the shaft and sight turning together. An external clamp 58 is provided to hold the arm 57 and sight 60 in any desired position after adjustment. A slot 59 the horizontal center line of which is the zero line 55, is provided in the board 40 and in it there is slidably fitted a shoe 62 adapted to carry a second sighting member 63 circularly adjustable thereon and provided with a peep hole 64. A clamp 65 is adapted to hold this sight in position after adjustment. On the arm 57 which is offset from the shaft 56 there is slidably mounted a carrier 66 provided with a needle sight 67 the point of which is in line with the line of sight through the peep hole 61 of the sight 60 so that the rotation of the arm 57 rotates an imaginary line indicated on the drawing at 68 and passing through the center of rotation of the shaft 56 through the peep hole 61 and the point of the needle sight 67. A clamp indicated at 69 serves to hold the carrier at any desired place on the arm 57 after adjustment. A second aperture 70 in the board 40 is adapted for the reception of the sight 63 which may be removed from the shoe 62 for that purpose. This aperture is vertically above the axis of rotation of the arm 57.

The operation of the instrument is based upon the principle that in triangles having the same angles the lengths of their corresponding sides are proportional. Supposing that it is desired to ascertain the vertical and horizontal distance from the point A (Fig. 9) of the point X at the edge of an inaccessible cliff. A tripod 15 is so placed that the center of its staff 10 is in a vertical plane with the point from which the measurement is to be taken. The board 40 is placed on the cross arm 30 and the latter is then raised to such a height on the staff and the board 40 is slid to such a position on the arm that the center of axis of rotation of the arm 57 is coincident with the point from which the measurement is to be taken and that point on the board will be called A. The arm 57 is then swung around on its axis until the point X is visible through the peep hole 61 in the sight 60 and the line of sight through the peep hole toward the point X coincides with the position of the needle point 67. In the meantime a horizontal ground line 100 has been measured a fixed distance back from the point A, say 100 feet, and at its termination a second tripod is set up and its cross arm 30 on its staff 10 is leveled up so that its horizontal center line is in the same horizontal plane as the horizontal center line of the cross arm 30 on the first tripod. The board 40 on which the arm 57 has been clamped to the position to which it was set in sighting the point X is then removed from the cross arm on the first tripod and set up on the cross arm of the second tripod with the shoe 62 carrying the second sight 63 located in the ground line determined upon and at the said fixed distance from the original distance A, namely, one hundred feet. First, however, the shoe 62 carrying the second sight 63 is moved to the right along the scale 48 a distance proportional to the length of the ground line, say 10 points in which each point would represent 10 feet, and this point is called b on the board. The sight 63 is then pointed toward the object X and the sight 67 slid along the arm 57 until the needle point of the sight 67 and the peep hole of the sight 63 are in the same line of sight. At that place, which we will call $x$ the sight 67 is stopped and clamped in position.

It is obvious that the triangle $b, a, x$ on the board 40 made by the fixed sight 60, the movable sight 62 and the movable sight 67 has the same angles as the imaginary triangle A, X, b. It is further obvious that the vertical distance of the point $x$ above the zero line 55 is proportional to the vertical distance of the inaccessible point X above the horizontal plane along which the base line is measured and which distance we will call Y, and that the horizontal distance between the point $a$ and the point of intersection of the vertical plane passing through the zero line 55 and the point X and measured along said zero line 55 and which we will call Z, is proportional to the similar distance $z$ measured on the reading board. If the scale 50 is slid along the board 40 to measure the vertical distance of the needle point 67 from the zero line 55 on such scale, and if the horizontal distance from the center of rotation of the arm 57 on the scale 49 is read from such scale 49 when the vertical scale 50 is in the last mentioned position, then if the graduations on the scales 50 and 49 are identical with those on the scale 48 the distance in feet of the inaccessible point X from the point A horizontally and vertically are the readings on such scales 50 and 49 without any calculation. In quite a similar way the sight 63 is moved to the aperture 70 to correspond to a vertical line, being the distance between the center of that sight and the axis of the swinging arm. This is for use where the vertical height of an object is so small relatively as to introduce an error from inaccuracy in determining the angles made by its image with the horizontal.

It will, of course, be understood that two tripods and staves are not necessary because the first one can be moved to a second position, but they are convenient.

What I claim is:

1. A surveying instrument comprising a reading board, an arm mounted on the board and adapted to be moved parallel thereto and carrying a sight, a second sight at a point on the arm fixed with respect to the board and a third sight adapted to be secured to the board at a measured distance from the second sight.

2. A surveying instrument comprising a reading board, an arm mounted on the board and adapted to be moved parallel thereto and carrying a sight, a second sight at a point on the arm fixed with respect to the board and a third sight adapted to be secured to the board at a measured distance from the second sight, said board having scales adapted to measure the extent of the lineal movement of the second and third sights with respect to the first one.

3. A surveying instrument comprising a reading board, an arm mounted on the board and adapted to be moved parallel thereto and carrying a sight, a second sight at a point on the arm fixed with respect to the board and a third sight adapted to be secured to the board at a measured distance from the second sight, said board having scales adapted to measure the extent of the lineal movement of the second and third sights with respect to the first one, and of the arm with respect to predetermined planes.

4. A cross-section surveying instrument comprising a reading table, an initial sighting center thereon, an arm adapted to swing on such center, a sight adapted to be moved along the arm, a second sight fixed at such center and a third sight adapted to be moved to a position with respect to such center at a distance proportional to the length of a selected base line.

5. A cross-section surveying instrument comprising a reading table, an initial sighting center thereon, an arm adapted to swing on such center, a sight adapted to be moved along the arm, a second sight fixed at such center, and a third sight adapted to be moved to a position with respect to such center at a distance proportional to the length of a selected base line, said instrument having scales for measuring the position of the first sight on the arm with respect to the initial sighting center.

6. A surveying instrument comprising a reading board having a plane surface provided with a base line, and means for determining the angular position of a distant object with respect to a fixed point in said base line and for determining the angular position of the same object with respect to a second point in the same base line at a predetermined distance from the first point.

7. A surveying instrument comprising a reading board having a plane surface provided with a base line, and means for determining the angular position of a distant object with respect to a fixed point in said base line and for determining the angular position of the same object with respect to a second point in the same base line at a predetermined distance from the first point, in combination with means for measuring the distance of the point of intersection of the two lines of sight from the two points of the distant object to the fixed point in the base line.

8. A surveying instrument comprising a reading board having a plane surface provided with a base line, and means for determining the angular position of a distant object with respect to a fixed point in said base line and for determining the angular position of the same object with respect to a second point in the same base line at a predetermined distance from the first point, said board having scales adapted to indicate the distance in a plurality of directions from the fixed point in the base line.

9. A surveying instrument comprising a reading board having a plane surface provided with a base line, and means for determining the angular position of a distant object with respect to a fixed point in said base line including an arm adapted to be moved radially around such point, and for determining the angular position of the same object with respect to a second point on the same line at a predetermined distance from the first point.

10. A surveying instrument comprising a reading board having a plane surface provided with a base line, and means for determining the angular position of a distant object with respect to a fixed point in said base line including an arm adapted to be moved radially around such point, and for determining the angular position of the same object with respect to a second point on the same line at a predetermined distance from the first point including a sight movable on the arm.

11. A surveying instrument comprising a reading board having a plane surface, provided with a base line, and means for determining the angular position of a distant object with respect to a fixed point in said base line including an arm adapted to be moved radially around such point, and for determining the angular position of the same object with respect to a second point on the same line at a predetermined distance from the first point including a sight movable on the arm, and means for determining the ordinate and abscissa of the movable sight with respect to the fixed point.

12. A surveying instrument comprising a reading board having a plane surface provided with a base line, and means for determining the angular position of a distant object with respect to a fixed point in said base line and for determining the angular position of the same object with respect to a second point in the same base line at a predetermined distance from the first point, said board having a scale adapted to indicate distances along the base line, and a second scale on the board adapted to indicate distances at right angles to the base line.

13. A surveying instrument comprising a reading board having a plane surface provided with a base line, and means for determining the angular position of a distant object with respect to a fixed point in said base line and for determining the angular position of the same object with respect to a second point in the same base line at a predetermined distance from the first point, said board having a scale adapted to indicate distances along the base line, said instrument having a scale adapted to measure the angle of the object viewed to the base line at the fixed point.

14. In an instrument of the character described, a reading board having a plane surface, an arm pivoted to the board and adapted to swing around a fixed point on such surface, said board having a base line adapted to pass through such fixed point, a sight movable along the base line, and a sight movable along the arm.

15. In an instrument of the character described, a reading board having a plane surface, an arm pivoted to the board and adapted to swing around a fixed point on such surface, said board having a base line adapted to pass through such fixed point, said board having a sight movable along the base line, and a sight movable along the arm, and a sight at the fixed point in the base line.

16. In an instrument of the character described, a reading board having a plane surface, an arm pivoted to the board and adapted to swing around a fixed point on such surface, said board having a base line adapted to pass through such fixed point, a sight movable along the base line, a sight movable along the arm, said board having a fixed scale along the base line and a movable scale at right angles thereto.

17. In an instrument of the character described, a reading board having a plane surface, means for moving it in a vertical plane and maintaining it in the position to which it is moved, said board having a horizontal scale and a vertical scale on the board, said scales being identically graduated from an intersecting point, and an arm adapted to be swung in a vertical plane around such point.

18. In an instrument of the character described, a reading board having a plane surface, means for moving it in a vertical plane and maintaining it in the position to which it is moved, said board having a horizontal scale and a vertical scale on the board, said scales being identically graduated from an intersecting point, and an arm adapted to be swung in a vertical plane around such point in combination with three sighting devices, one at said point, another movable along the arm and a third movable either horizontally or vertically with respect to such point.

19. A surveying instrument comprising a vertical staff, a reading board vertically adjustable supported thereon, means for moving it horizontally with respect to the staff, an arm adapted to rotate in a plane parallel to the surface of the board, a sight at the center of such rotation and a second sight movable along the arm.

20. A surveying instrument comprising a vertical staff, a reading board vertically adjustable supported thereon, means for moving it horizontally with respect to the staff, an arm adapted to rotate in a plane parallel to the surface of the board, a sight at the center of such rotation, and a second sight movable along the arm, in combination with a third sight removably secured to the board at an ascertained distance from the center of rotation of the arm.

21. In an instrument of the character described, a reading board provided with a sighting device adapted to serve as a shaft for a swinging arm, said board having an aperture, a shoe adapted to slide therein and a sight carried by the shoe.

22. In an instrument of the character described, a reading board provided with a sighting device adapted to serve as a shaft for a swinging arm, said board having an aperture, a shoe adapted to slide therein and a sight carried by the shoe, a swinging arm on the shaft and a sight adjustably secured to the arm.

23. In an instrument of the character described, a reading board provided with a sighting device adapted to serve as a shaft for a swinging arm, said board having an aperture, a shoe adapted to slide therein and a sight carried by the shoe, a swinging arm on the shaft and a sight adjustably secured to the arm, the effective lines of sight through all the sighting devices lying in the same plane parallel with the surface of the reading board, said instrument having scales adapted to measure the positions of the sights with respect to each other.

In testimony whereof I affix my signature in presence of two witnesses.

ROBERT YATES.

Witnesses:
HELEN V. FITZPATRICK,
MARY H. LEWIS.

Copies of this patent may be obtained for five cents each, by addressing the "Commissioner of Patents, Washington, D. C."